(No Model.) 2 Sheets—Sheet 1.
E. W. KELLEY.
MACHINE FOR OPENING COTTON.
No. 470,937. Patented Mar. 15, 1892.
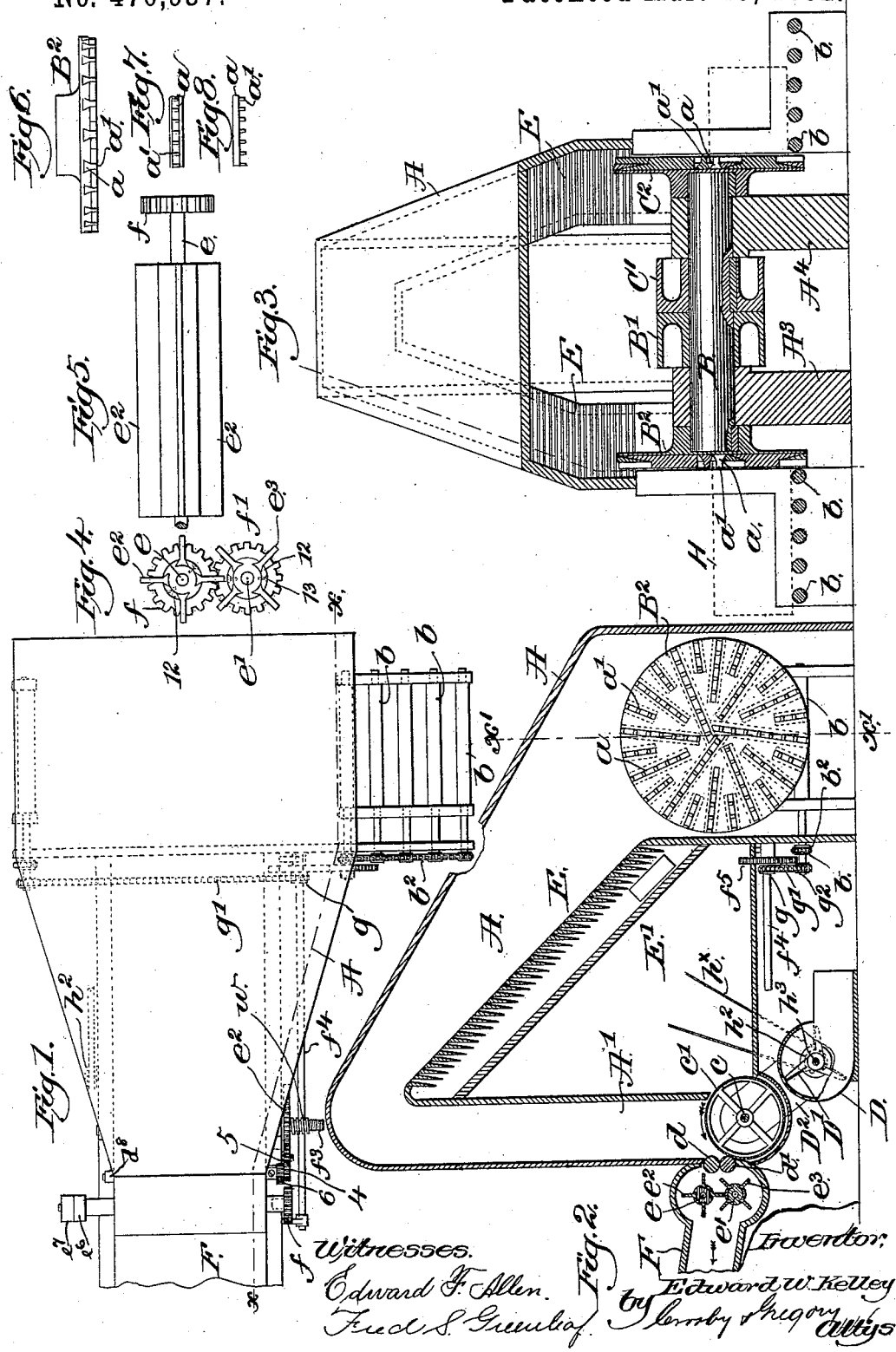
Witnesses.
Edward F. Allen
Fred S. Greenleaf
Inventor:
Edward W. Kelley
by Crosby & Gregory
Attys.

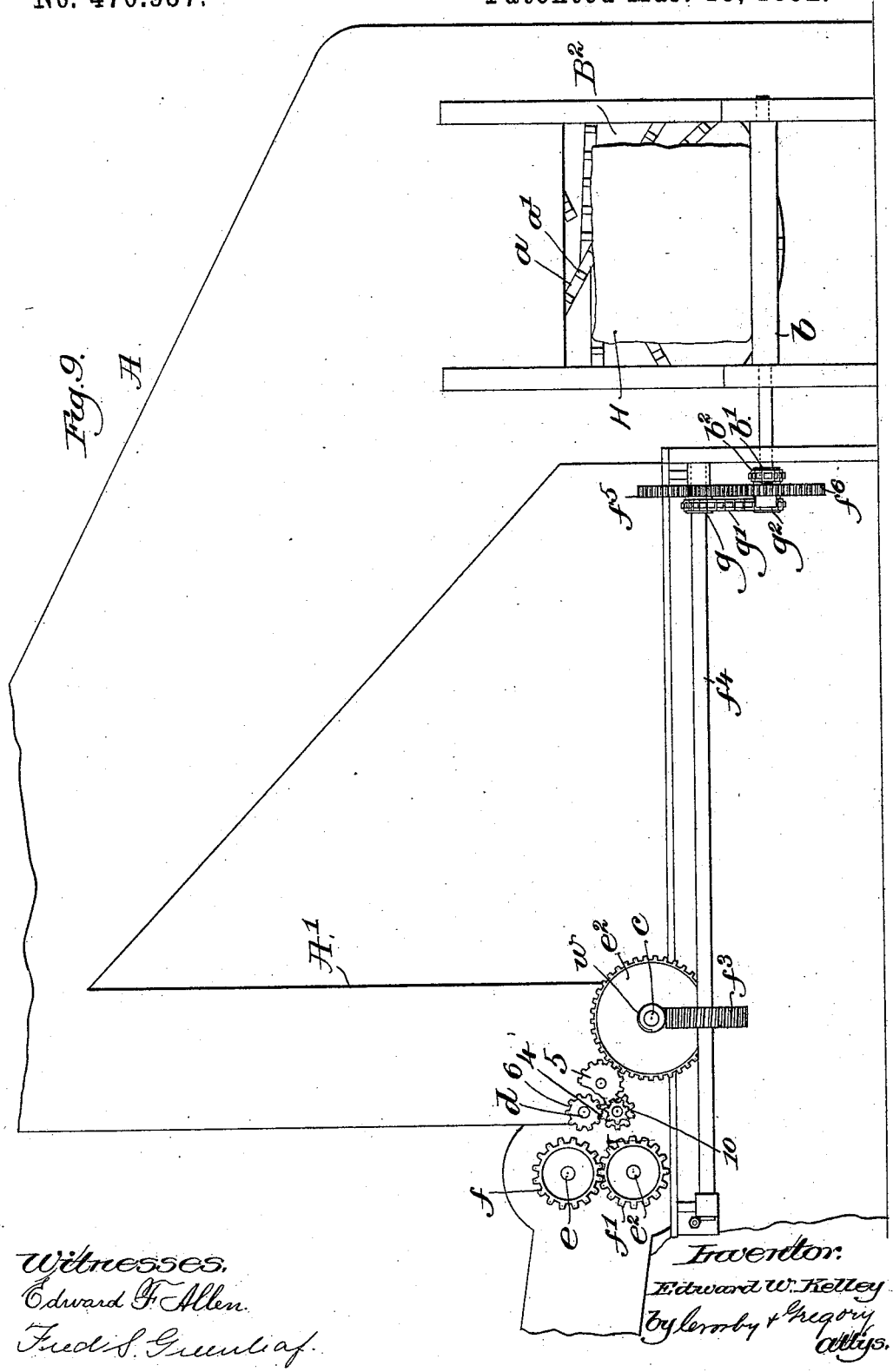

UNITED STATES PATENT OFFICE.

EDWARD W. KELLEY, OF LOWELL, MASSACHUSETTS.

MACHINE FOR OPENING COTTON.

SPECIFICATION forming part of Letters Patent No. 470,937, dated March 15, 1892.

Application filed July 20, 1891. Serial No. 400,077. (No model.)

*To all whom it may concern:*

Be it known that I, EDWARD W. KELLEY, of Lowell, county of Middlesex, State of Massachusetts, have invented an Improvement in Machines for Opening Cotton, of which the following description, in connection with the accompanying drawings, is a specification, like letters and figures on the drawings representing like parts.

Cotton produced on plantations is put into bales for transportation. These bales go to the cotton-factories, where they are opened and broken up by hand, the cotton being fed to a willow or to a picker or to one such machine after another to form a bat, which is wound on a lap-roll ready to be delivered to a carding-machine, which prepares the cotton for subsequent steps in yarn or thread making. I have carried on experiments with the object in view of dispensing with some of the handling to which cotton is now subjected between the bale and the carding-machine. As a result of my experiments I have devised a machine in which the commercial bale of cotton may be acted upon directly by teeth of a rotating carrier, which teeth take the cotton from the bale in small particles and throw it into a trunk having appliances to enable dust, dirt, and other foreign particles to drop out, the movement of the cotton in the machine being aided by an exhaust or other equivalent fan, and the cotton taken from the trunk by condensing-rolls is thereafter acted upon by beaters located in a suitable trunk leading to some suitable or well-known form of picker or apparatus adapted to form the cotton into a bat and wind it upon a lap-roll to be fed to a carding-machine.

My improved machine, as herein represented, is adapted to receive two bales of cotton, a portion of one side or end of each bale by a suitable bale-feeding device being kept pressed forward within the range of movement of the teeth which detach the cotton from the bale.

One part of my invention in machines for treating cotton consists, essentially, in the combination, with a support for a bale of cotton, of a rotating toothed opening device adapted to act against one end or face of the bale to detach the cotton therefrom, substantially as will be described.

Other features of my invention will be hereinafter described, and pointed out in the claims at the end of this specification.

Figure 1 is a top or plan view of a sufficient portion of a machine for treating the cotton to enable my invention to be understood; Fig. 2, a longitudinal section thereof in the irregular dotted line $x\ x$, Fig. 1; Fig. 3, a section of the apparatus shown in Fig. 2 on the dotted line $x'\ x'$, the bale-feeding device shown broken off from one side of the apparatus in Fig. 1, being, however, shown in Fig. 3; Figs. 4 and 5, details of the beaters located in front of the condensing-rolls; Figs. 6, 7, and 8, details of one form of toothed opening device. Fig. 9 is an enlarged side elevation of the machine shown in Fig. 1.

Referring to the drawings, A represents a trunk, shown as tapering, and A' a collecting leg or flue in communication therewith. The trunk and collecting-leg form part of the frame-work of the machine. Others portions of the frame-work are of suitable shape to properly support the working parts.

The frame-work has uprights $A^3\ A^4$, which in practice will support suitable bearings or boxes for the shaft B, provided with suitable fast and loose pulleys B' C' to receive a band or to be driven in any usual way by power. This shaft B has at its opposite ends opening devices $B^2\ C^2$, both alike, so I need specifically describe but one of them, and herein the one described will be that one marked $B^2$. As represented, the opening device is composed of a disk having a series of radial grooves in which are placed bars $a$, having suitable teeth $a'$, the said bars in practice being preferably arranged so that the teeth of adjacent bars will be staggered. I prefer to let the teeth be carried by bars, so that the toothed surface may be renewed at will; but it is not intended to limit this invention in all instances of its use to making the teeth upon bars or to the particular shape of teeth shown, as I may employ any usual or suitable toothed surface. The toothed surfaces are represented as facing outwardly, and co-operating with each toothed opening device is a bale-feeding device, herein represented as composed of a series of small rolls $b$, each having a suitable sprocket-wheel, as $b'$, over which is extended a sprocket-chain $b^2$, the said sprocket-chain acting to rotate all the said rolls positively and at a slow speed, so that the bale of cotton acted upon by the roll will have one end or face thereof borne constantly, but not too hard, against and in path of movement of the teeth $a'$ of whatever form used.

Machines employed in the treatment of fibrous material have many different forms of feed-aprons or devices to feed forward the material to be acted upon, and instead of the particular bale-feeding device herein represented I may employ any other usual or suitable devices to keep the bale properly in position to give up its cotton a little at a time to the rotating opening device. The feeding device at the same time that it feeds the bale also acts as a support for the bale. The cotton detached from the bales is thrown from the teeth by centrifugal action, and, aided by the action of a fan D, to be described, is carried up along through the trunk A and down into the collecting-leg A', any dirt, dust, and other foreign particles heavier than the cotton fiber dropping upon the grid E in the trunk A, the said grid being composed, as represented, of a series of slats separated at their upper edges and thinner at their lower edges than at the upper edges, so as to let any particles passing through the open slots of the grid drop readily into the mote-chamber E', from which said dust, dirt, &c., may be taken in any usual manner. Preferably the parts of the grid will be made movable and removable.

At the lower end of the collecting-leg I have mounted upon a suitable shaft $c$ a reticulated drum $c'$, the surface of which is preferably composed of wire-cloth, and in front of this drum, to the left, as herein represented, and at the lower part of the collecting-leg, I have mounted in suitable bearings condensing-rolls $d\ d'$, which take the loose cotton from the collecting-leg and present it to the beaters composed of shafts $e\ e'$, having non-metallic blades $e^2\ e^3$, the said blades being preferably made of leatheroid or equivalent material suitably attached to the said shafts, such material being used because of less liability to strike fire by coming in contact with any hard substances which by accident may get into the cotton. The shaft $e$, containing the beaters $e^2$, as shown in Fig. 1, is provided with a fast and loose pulley $e^6\ e^7$, and in practice the fast pulley will receive a belt (not shown) driven from any suitable source to rotate the shaft $e$. At its opposite end the shaft $e$ has a pinion $f$, which engages a pinion $f'$ on and rotates the lower beater-shaft $e'$.

In the form in which I have herein shown my invention as embodied I have chosen to drive the condensing-rolls by a suitable belt (not shown) extended from any suitable counter-shaft over a pulley $d^8$ on one end of the shaft of the uppermost condensing-roll $d$, the said shaft having at its opposite end (see Fig. 1) a pinion 6, which engages a pinion 4 on the shaft of the undermost condensing-roll $d'$, the latter shaft having a second pinion 10, which engages an intermediate gear 5 on a suitable stud, the said intermediate gear engaging the gear $e^2$, fast on the shaft of the reticulated drum $c'$. The relative sizes of the gears 10, 5, and $e^2$ may be proportioned as desired. The shaft of the drum $c'$ has a worm $w$, which engages a worm-gear $f^3$ on a shaft $f^4$, having, as represented, a toothed gear $f^5$, which engages a toothed gear $f^6$, fast on that one of the bale-feeding rolls $b$ which is nearest the toothed opening device, the shaft of that roll having a sprocket-gear which engages and imparts motion to the sprocket-gear $b^2$, before referred to. The shaft $f^4$ has a sprocket-wheel $g$, which receives and drives a sprocket-chain $g'$, surrounding a sprocket-wheel $g^2$ on one of the shafts of the bale-feeding device at the opposite side of the machine, the said chain $g'$ being passed across under the trunk A.

The exhaust fan or blower D for the best results needs to be run very rapidly, and in practice I prefer to drive the same from a pulley on some proper counter-shaft, and therefore I have shown the shaft $h^3$ of the fan as provided with a small pulley $h^2$ to receive the belt $h^\times$, which in practice will be driven from some suitable pulley on some suitable counter-shaft, such provision enabling the fan to be run at any desired speed. The said fan and its case D' may be of any usual construction common to suction-fans, and the case will be in communication with some suitable chamber or otherwise, into which may be discharged the dirt, dust, &c., taken from the trunk. The inlet-pipe $D^2$ of the fan is joined with the interior of the reticulated cylinder $c'$.

The cotton taken by the beater-blades from the condensing-rolls $d\ d'$, which may also be designated as "feed-rolls," is drawn along the trunk F, and in practice during some part of its travel thereon will pass between suitable reticulated rolls—one above and one below, as in ordinary pickers for treating cotton—which rolls will condense the cotton into a lap or bat, which may be thereafter wound in any usual or suitable manner upon a lap-roll, making what is denominated a "lap" for a card.

The beater-blades $e^2\ e^3$ referred to, as best shown in Fig. 4, are made wider at their inner edges and somewhat triangular or dovetail in shape, and the wider ends of the blades are represented as held in position upon the body of the rolls by means of bars 12, held in place by screws 13.

The bale of cotton to be acted upon is marked H. The teeth on the opening devices $B^2\ C^2$ are of such shape as to pull the cotton from the bale without destroying the staple, and by taking the cotton from two bales at the same time the mixture of the cotton may be varied, and by varying the speed of the feeding devices which feed the bales to their respective openers the mixture may be yet further controlled, the feed in this instance being varied by employing change-gears.

This invention is not to be limited to the particular construction or arrangement of parts shown, as the same may be varied, and the fan-shaft and the condensing-rolls may be driven in any suitable manner and by any suitable devices at suitable speed.

The speed of rotation of the beaters is and will in practice be very rapid, so as to take the cotton from the condensing-rolls, and the beaters are so located upon their shafts and the gearing connecting the beaters is such that the blade of one beater works into the space between the blades of the opposed beater, and the point at which the cotton is nipped after passing the condensing-rolls is at a distance greater from the bite of the rolls than the length of the staple, so that the cotton is pulled from the condensing-rolls with an easy draft, so as to prevent breaking of the staple.

I claim—

1. In a machine for treating cotton, the combination, with a support for a bale of cotton, of a rotating opening device adapted to act against one end or face of the bale to detach the cotton therefrom, means to convey away the released cotton, and means to form it into a bat, substantially as described.

2. In a machine for treating cotton, the combination, with a support for a bale of cotton, of a rotating toothed opening device adapted to act against one end or face of the bale to detach the cotton therefrom, a trunk into and along which the detached cotton is passed, and means connected with said trunk to receive the cotton and form it into a bat, substantially as described.

3. In a machine for treating cotton, two or more series of feeding devices, combined with two or more opening devices adapted to take cotton or fibrous material from said feeding devices and discharge it into a common trunk or receptacle, and means connected with said trunk to receive the cotton and form it into a bat, substantially as described.

4. In a machine for opening cotton, a support for a bale or mass of cotton, combined with a rotating opening device made as a disk having a series of radial slides provided with teeth, substantially as described.

5. A machine for treating cotton, comprising a rotating toothed device to take the cotton from the bale, a trunk to receive the released cotton from said device, a grid in said trunk to free it of dust, a leg depending from the opposite end of such trunk, a reticulated cylinder at the bottom of such leg, and an exhaust-fan, all combined and arranged to operate substantially as described.

6. A machine for treating cotton, comprising a rotating toothed device to take the cotton from the bale, a trunk to receive the released cotton from said device, a grid in said trunk to free it of dust, a leg depending from the opposite end of such trunk, a reticulated cylinder at the bottom of such leg, an exhaust-fan, condensing-rolls adjacent to said cylinder, and a beater next said condensing-rolls, all combined and arranged to operate substantially as described.

7. In a machine for treating cotton, bale-feeding mechanism, a toothed surface to take the cotton from the said bale, a trunk, and condensing-rolls to condense the opened cotton, combined with a pair of beaters to pull the cotton from between the said condensing-rolls, substantially as described.

In testimony whereof I have signed my name to this specification in the presence of two subscribing witnesses.

EDWARD W. KELLEY.

Witnesses:
 JAMES F. OWENS,
 GEORGE W. POORE.